(12) United States Patent
Jackson et al.

(10) Patent No.: US 6,195,491 B1
(45) Date of Patent: Feb. 27, 2001

(54) OPTICAL FIBER RIBBON HAVING DIFFERENTIALLY ENHANCED MATRIX TO INK ADHESION

(75) Inventors: Kenneth Wade Jackson, Snellville; Kariofilis Konstadinidis, Decatur; Shahabuddin Siddiqui, Lawrenceville; Neil Wilbur Sollenberger, Duluth, all of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/302,062

(22) Filed: Apr. 29, 1999

(51) Int. Cl.[7] .................................................. G02B 6/44
(52) U.S. Cl. ............................................... 385/114; 385/106
(58) Field of Search ....................................... 385/114, 106

(56) References Cited

U.S. PATENT DOCUMENTS

| 3,920,432 | | 11/1975 | Smith ................................................ 65/4 |
| 4,147,407 | | 4/1979 | Eichenbaum et al. ............. 350/96.34 |
| 4,900,126 | | 2/1990 | Jackson et al. .................... 350/96.23 |
| 5,809,195 | * | 9/1998 | Brown et al. . |
| 6,040,357 | * | 2/2000 | Murphy et al. . |
| 6,053,085 | * | 4/2000 | Lochkovic et al. . |

* cited by examiner

Primary Examiner—Frank G. Font
Assistant Examiner—Tu T. Nguyen

(57) ABSTRACT

An optical fiber ribbon capable of being divided into two or more robust sub-units along predetermined dividing lines has a plurality of optical fibers in a substantially flat array which have a first, low, matrix-to-fiber coating, which may be a coloring ink, adhesion for facilitating mid-array or mid-span fibers access. The two fibers on either side of each of the dividing lines and adjacent thereto and to each other, have an enhanced or high matrix-to-fiber coating adhesion whereby the sub-units created by the division are sufficiently robust to retain the fibers within the matrix.

14 Claims, 2 Drawing Sheets

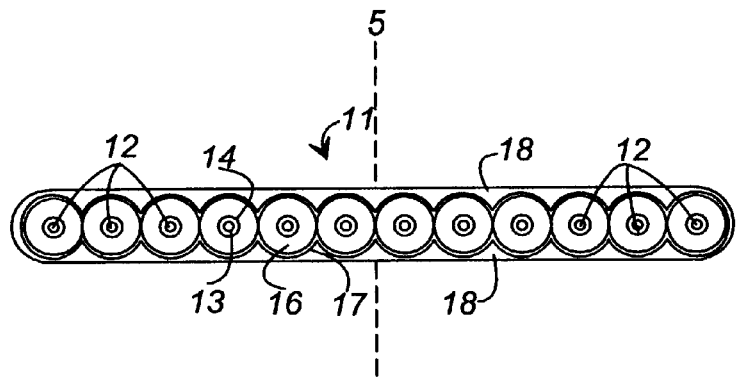
FIG. 1 *(PRIOR ART)*
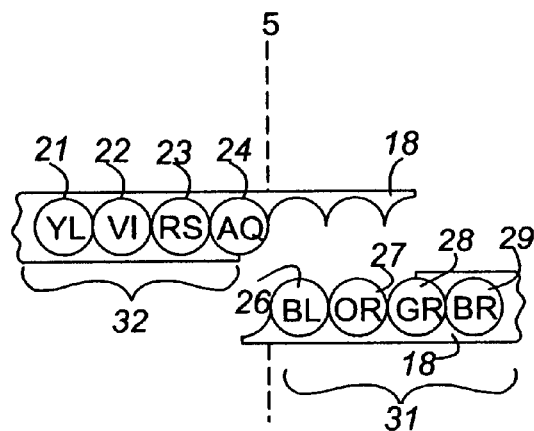
FIG. 2 *(PRIOR ART)*
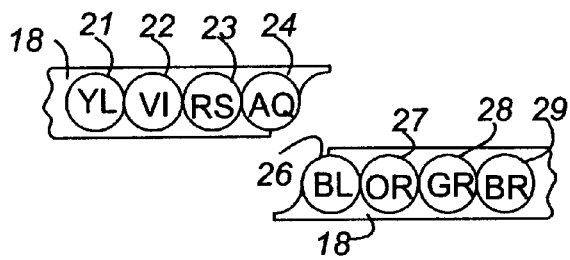
FIG. 3

OPTICAL FIBER RIBBON HAVING DIFFERENTIALLY ENHANCED MATRIX TO INK ADHESION

RELATED APPLICATIONS

This application is related to and deals with subject matter similar to U.S. patent application Ser. No. 09/154,670 of Chandraiah et al., filed Sep. 9, 1998, and to application Ser. No. 09/176,715 of DeFabritis et al., filed Oct. 21, 1998, the disclosures of which are incorporated herein by reference.

FIELD OF INVENTION

This invention relates to dividing an optical fiber ribbon and, more particularly, to a differential ribbon bonding matrix-to-ink adhesion for the optical fiber ribbon for producing robust sub-units.

BACKGROUND OF THE INVENTION

Optical fiber cable development, wherein the cable is capable of multi-channel transmission, has led to the use of bonded arrays of fibers which form a planar ribbon, and to stacks of ribbons within a core tube or sheath. In a typical ribbon array, a plurality of fibers, e.g., twelve or twenty-four, are held in spaced position parallel to each other by a suitable matrix, a configuration which simplifies construction, installation, and maintenance by eliminating the need for handling individual fibers. Thus, the splicing and connecting of the individual fibers can be accomplished by splicing and connecting the much larger ribbons provided that the fiber positions in the ribbon are precisely fixed and maintained.

In the prior art, numerous ribbon arrays have been proposed, all directed at achieving the aforementioned alignment as well as being directed to other aspects of ribbon construction and geometry. Among these is the adhesive sandwich ribbon (ASR) as disclosed in U.S. Pat. No. 4,147,407 of Eichenbaum, et al. and U.S. Pat. No. 3,920,432 of Smith. Such ribbon structures have proven to be easy to manufacture, rugged, and compact, and suitable for mass splicing. However, the use of adhesive tapes to form the sandwich necessitates a slow-down in the processing speed during manufacture and in an increased cost of the finished product, as well as the added loss to the fibers.

In U.S. Pat. No. 4,900,126 of Jackson, et al., the disclosure of which is incorporated herein by reference, there is shown a bonded optical fiber ribbon which comprises a coplanar array of longitudinally extending parallel optical fibers in contact with each other. Each fiber is enclosed in inner and outer layers of coating materials and has a color identifier coating for differentiating each fiber from the other fibers. The inner layer comprises an ultra-violet curable bonding material having a modulus of approximately 1 MPa and an outer layer of an ultra-violet curable bonding material having a modulus of approximately 1 GPa for mechanical protection. With the fibers disposed in a parallel array, interstices are created between the fibers themselves and between the fibers and the envelope of the ribbon, which is a matrix formed of an ultra-violet curable bonding material having a modulus that is less than the modulus of the outer coating layer on the fiber and which is greater than the modulus of the inner coating layer. The matrix material fills the interstices and bonds the fibers together and to the envelope to form a completed ribbon. The modulus and the surface characteristics of the matrix material and its bond to the color identifier on each fiber are such that interfiber and inter-ribbon movement can occur, thus the ribbons in a stack can slide relative to each other when the cable is bent and also that accessing of individual fibers is possible. The ribbons may be stacked such that eighteen ribbons, for example, having twelve fibers each, may be enclosed within a core tube to form the core of an optical fiber cable having two hundred and sixteen fibers, or, if preferred, channels. The core tube itself has an outside diameter (O.D.) of approximately 0.6 inches. Such an arrangement, which is in widespread use today, has proved adequate for most present day applications, but it imposes a definite upper limit on the numbers of fibers available and their individual identification and their accessibility.

There is, today, an ever-increasing demand for increased optical fiber cable capacity which is expected to continue into the foreseeable future. Higher fiber count cables and higher fiber packing densities are under constant and ongoing study and development. Extremely high fiber count cables have been proposed that use downsized fiber coating aimed at increasing packing density, however, the long term reliability, engineering, and operational characteristics are not, as yet, fully understood. Hence, an increase in the number of fibers, and, in turn, an increase in packing density, in a standard sized cable and with fibers having the standard thickness of fiber coating, is greatly to be desired. In an article entitled "A Modular Ribbon Design For Increased Packing Density of Fiber Optical Cables" by K. W. Jackson, et al., International Wire & Cable Symposium Proceedings 1993 at pages 20 through 27, the disclosure of which is incorporated herein by reference, there are given the results of a study of the feasibility of increasing the fiber packing density in a high fiber count cable. The cable design concept disclosed therein is based upon a modular structure of the ribbons used in the cable, and it is determined that the packing density for existing cable designs can be increased by as much as thirty to fifty percent. The ribbon structure proposed in that article comprises, for example, an array of sixteen fibers in side by side contacting relationship and divided, as by color coding of the fibers, into two eight fiber modules which, in turn, can be divided into four fiber modules. Each of the ribbons to be stacked within the cable bears, on its surface, identifying alphanumeric numbers. Thus, each fiber within each module in the stack is uniquely identified by two identifiers, i.e., color and ribbon number.

As pointed out in the aforementioned Jackson et al. patent, the color identifier material of each of the fibers should not be removed from the fiber when the bonding material is removed to access the fibers. Thus, the matrix material of the bonded ribbons is selected to have an interfacial bonding characteristic such that the bond interface of the matrix material to the coloring material is weaker than the bonding interface of the coloring material to the outermost coating on the optical fiber. In at least one embodiment of the invention of that patent, a release agent is applied over the coloring material prior to application of the matrix bonding material. There remains a problem, however, in breaking out separate modules from the ribbon, and individual fibers from the module. In high fiber count cables, where, for example, ribbons of twenty-four fibers are used, in most cases, it will be necessary or desirable to divide the ribbon into sub-units of twelve, six, four, or other numbers of fibers, for routing within the network or for achieving precise splicing. Inasmuch as it is the generally accepted practice, as pointed out, to have the bond between the matrix material and the coloring material, i.e. ink, weaker than the bond between the ink and the outermost coating of the fiber, dividing a ribbon into sub-units can result in sub-units of less than desired robustness. The edge fibers in a sub-unit thus produced, that is, those fibers adjacent the line of division, are exposed, and are not as firmly held by the matrix. Thus, they can separate from the ribbon sub-unit during handling. On the other hand, accessing individual fibers that are, for example, in the mid-span of the sub-unit, requires low adhesion between matrix and ink. In the past this dilemma has required a careful balancing of adhesions to achieve a measure of robustness while maintaining strippability for individual fibers.

SUMMARY OF THE INVENTION

The present invention is a fiber optic ribbon structure that, in large part solves the aforementioned problem of the prior art in that it allows division of the ribbon into robust sub-units without compromising ease of single fiber accessibility or reducing sub-unit, while maintaining a highly productive process strippability.

In, for example, a twenty-four fiber ribbon structure, it is the usual practice to divide out sub-units consisting of twelve or eight fibers per unit. In other instances, it may be desired to have sub-units of six fibers, or four fibers per unit. Thus, in the twenty-four fiber ribbon to be divided into sub-units of eight fibers each ribbon will have two imaginary separation or dividing lines equally spaced by the width of an eight fiber span. It is also possible to pre-score the matrix surface at the location of the dividing line. In the present invention the two fibers nearest to, and on either side of the imaginary dividing line have a greater adhesion between the matrix and the coloring material than exists between the matrix and each of the remaining fibers. This differentially enhanced adhesion results in the edge fibers of a sub-unit being more tightly bound to the sub-unit so that they will not separate therefrom, even during somewhat rough handling. The invention, therefore, insures that the sub-units will be sufficiently robust, without degrading the strippability of the individual fibers within a sub-unit, moreover the invention allows for easy single fiber accessibility from a ribbon or sub-unit from either the end or mid-span.

There are numerous ways in which the adhesion between the matrix and the coloring material, which may be the second coating, having a coloring dye therein, of a dual coated fiber, can be achieved using the same matrix and fiber coating materials. Thus, the amount of release agent on the edge fibers may be reduced, or the surface of the color coating, whether ink or second coating, may be roughened by laser, by mechanical means, or surface chemistry altered by chemical means, so that the matrix material adheres more strongly to the coating. Alternatively, the ink or coloring dye formulation may be altered to have greater adhesion between matrix and ink.

It is also possible, utilizing the principles of the present invention that, during ribbon fabrication, all of the fibers be formulated to have high adhesion to the matrix and then selected fibers to be treated to have reduced adhesion to the matrix.

The invention, therefore is an optical fiber ribbon structure having a plurality of color coded optical fibers contained within a matrix, wherein selected fibers have differentially enhanced adhesion between the fiber coating and the matrix.

The principles of the present invention, as well as the features thereof in preferred embodiments, will be more readily apparent from the following detailed description, read in conjunction with the accompanying drawings.

DESCRIPTION OF THE DRAWINGS

FIG. 1 is a cross-sectional elevation view of an optical fiber ribbon;

FIG. 2 is a diagrammatic view of an undesirable consequence of dividing a prior art optical fiber ribbon;

FIG. 3 is a diagrammatic view of a more desirable result of dividing an optical fiber ribbon embodying the principles of the present invention.

DETAILED DESCRIPTION

Figure 4:
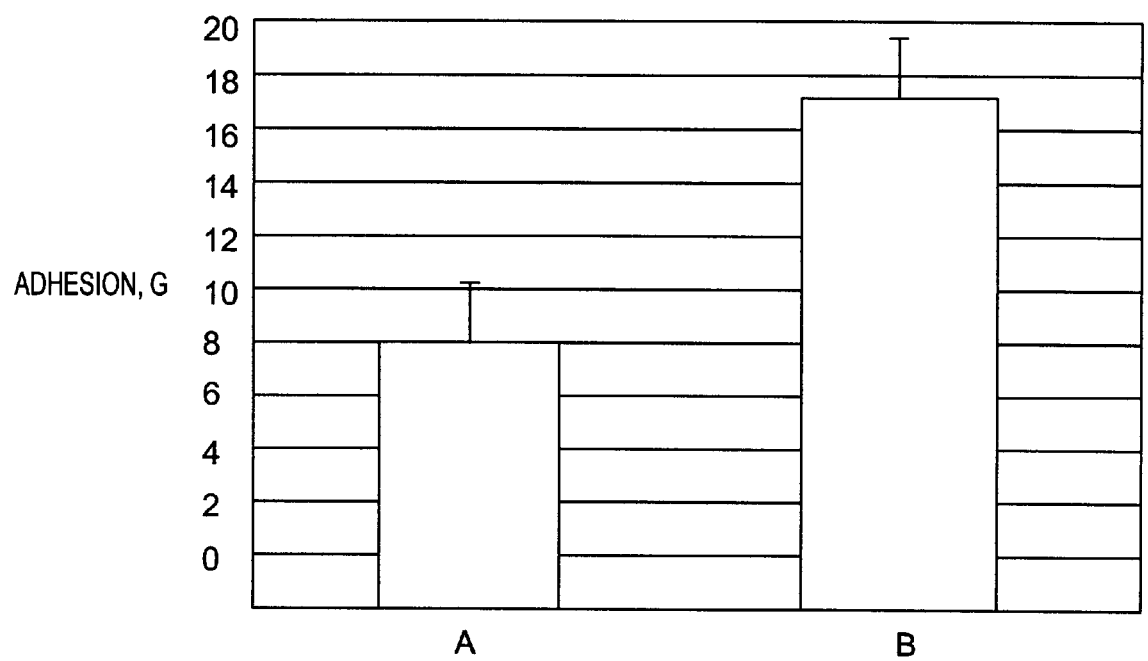
FIG. 4 is a bar chart illustrating the difference in matrix-to-colorant adhesion between the edge fibers and the mid-span fibers.

In FIG. 1 there is shown, in cross-section, an optical fiber ribbon 11 having twelve optical fibers 12 arrayed in side-by-side parallel relationship in a single plane. Only twelve fibers are shown, but it is to be understood that the following description applies equally as well to twenty-four fiber ribbons as well as ribbons having other pluralities of fibers. Each of the fibers 12 comprises a core 13 and a cladding 14, a first, inner coating 16 and a second, outer coating 17, and the several fibers 12 are held together in their planar array by a matrix 18. Although not visible in FIG. 1, outer coating or layer 17 has an identifying colored ink thereon for facilitating identification of each of the fibers relative to the others. It is to be understood that instead of first and second layers 16 and 17, each fiber may have only a single layer instead of the two shown, and, further, that layer or coating 17 may have a colorant incorporated therein. It is virtually a necessity that the coloring layer, whatever its make-up, i.e., ink, dye, or colorant incorporation not be removed or otherwise obscured when the matrix 18 is removed to gain access to the fibers. In accordance with standard practice, the material of matrix 18 and the surface of the color identifier is selected to have an interfacial bonding characteristic such that the bonding interface between the two materials is weaker than the bonding interface of the ink or colorant to the coating 17 on the fiber, or the coating 16 if coating 17 is not used. Such a desideratum can be achieved, for example, by the application of a release agent, not shown, over the ink or colorant, or by the inclusion of a release agent in the ink or colorant or matrix. The release agent creates a weak boundary layer at the interface of the matrix material and the colorant material. Further, to this end, the surface energy (surface tension) of the ink and matrix materials should be 20–35 mJ/m$^2$. By adjusting the surface energies, a coarse adjustment can be made to the ink-to-matrix adhesion. A fine adjustment of this adhesion parameter can be made by adjusting the surface cure of the ink. A measure of the surface cure is given by the residual acrylate unsaturation (RAU) of a UV colored fiber, which should be lower than 20%. In practice, it has been found that a range of 2 to 17% works best. A greater RAU leads to increased matrix adhesion.

UV curable matrix bonding material comprises, for example, a mixture comprising a resin, a diluent, and a photoinitiator. The resin may include an aliphatic or aromatic urethane acrylate and/or an epoxy acrylate/methacrylate. The diluent may comprise monofunctional or multifunctional acrylic acid esters having a molecular weight of 100–1000 Dalton. For the photoinitiator, the composition may include ketonic compounds such as 1-hydroxycyclohexyl phenyl ketone, diethoxyacetophenone, acetophenone, benzophenone, benzoin, anthraquinone, and benzil dimethyl ketal. In composition, the bonding matrix may include 50–90 percent weight resin, 5 to 10 percent diluents, and 1 to 10 percent photoinitiator. Additives containing silicon (Si) or fluorine (F) atoms may be added to improve the release properties of the bonding material. A UV curable coloring material (UV ink) is a mixture similar to that of the UV bonding material with the addition of pigments to achieve the desired color.

Another important property of the matrix bonding material is its modulus as related to temperature. Ideally, the modulus should not change significantly over the expected temperature range of operation, generally considered as −40° F. to 180° F. Where the fiber has a dual coating, layers 16 and 17, inner layer 16 generally has a modulus of about 1 MPa at room temperature and the outer layer has a modulus of approximately 1 GPa at room temperature. The matrix material 18 is a UV curable bonding material which has a modulus greater than 1 MPa, preferably in the range of 600–1200 MPa at room temperature. A higher modulus material may be used when the inner layer 16 comprises a relatively low modulus material. If the modulus is relatively high, thereby insuring sufficient mechanical strength, the release agent insures an easy release between the fiber and the colorant so that the colorant remains with the fiber where the matrix is removed.

As pointed out hereinbefore, the range of the elastic modulus of the matrix material at room temperature can extend from 600 to 1200 MPa. This range is highly satisfactory for accessing the fibers without destroying or weakening the ribbon. Too high a modulus at room temperature makes it more difficult to break out the fibers, while an extremely low modulus can seriously weaken the ribbon. Also, the elastic modulus should be relatively high at stripping temperatures (75° C.–150° C.).

It is often the case where it becomes necessary to split the ribbon 11 along the imaginary line S, for example. Inasmuch as the splitting or dividing is usually done in the field by an installer, it generally is done by hand, using any of a number of splitting tools such as the dental floss tool shown in copending U.S. patent application Ser. No. 09/176,715 of DeFabritis et al, filed Oct. 21, 1998. Such hand splitting more often than not results in an exposure of not only the edge fibers, i.e., the fibers on either side of dividing line S and adjacent thereto, but other fibers as well. As seen in FIG. 2, wherein fibers 21 through 24 and 26 through 29 are contained within matrix 18, the splitting or dividing operation along line S not only exposes edge fibers 24 and 26 (AQ and BL), but can result in fibers 27 and 28 (OR and GR) being exposed also, as a result of the relatively low adhesion between the colored fibers and the matrix. These exposed fibers within the sub-unit 31 detract materially from the robustness of the submit. For example, the exposed fibers 24, 26, and 27 can be dislodged from matrix 18 during handling, and, in extreme cases, simply fall loose from the matrix. In addition, they can become snagged on something and jerked loose.

FIG. 3 depicts the result that is most often achieved using the aforementioned dental floss tool. With such a tool, only fibers 24 (aqua) and 26 (blue) are left with only 90° or less of arc of their surfaces exposed, a much more desirable result. However, because of the relatively weak adhesion between the matrix and the colored fiber, there is still the danger that fibers 24 and 26 can become dislodged. The end fibers, i.e., the two outermost fibers, are protected from exposure by the matrix material itself, as can be seen in FIG. 1, for example.

In accordance with the present invention, a differentially enhanced matrix to ink (or coloring layer) adhesion is introduced during fabrication of the ribbon to reduce or substantially eliminate the results shown in FIG. 2 and to increase the robustness of the sub-units shown in FIG. 3. Thus, in the case of a twenty-four fiber ribbon, where it is expected that in use the ribbon is to be divided into, for example, two sub-units of twelve fibers each, those fibers which will be the edge fibers of the sub-units, in this case the twelfth and thirteenth fibers in the ribbon array, are given a greater adhesion between the matrix material and the coloring material of the fiber than exists for the remaining fibers. With the increased adhesion, the matrix adheres to these two fibers along the dividing or separating lines where the division takes place, and is thereby prevented from peeling which produces the result shown in FIG. 2, instead producing the result shown in FIG. 3 or other result wherein only two fibers are exposed, even if only slightly. In addition, the increased adhesion of the edge fibers to the matrix reduces the tendency of the edge fibers to break loose or to be broken loose. It is of course, possible to subdivide a ribbon into several sub-units, if desired, with the adjacent fibers on either side of each of the dividing lines having increased matrix-to-fiber adhesion. Thus, a twelve fiber ribbon may be divided into two sub-units of six fibers each, or four and eight fibers, or three sub-units of four fibers each, and in all cases the sub-units will be sufficiently robust to withstand rough handling. The ribbons, during the fabrication process, can be designated as divisible into a specified number of sub-units, and those fibers which will lie on either side of the imaginary dividing line and adjacent thereto given an increased matrix-to-coloring material adhesion. For example, for a twenty-four fiber ribbon to be amenable to division into four sub-units of six fibers each, the sixth and seventh, twelfth and thirteenth, and eighteenth and nineteenth fibers would be given the greater matrix-to-fiber (or coloring material) adhesion. On the other hand, the mid-span fibers will have lower matrix-to-fiber adhesion, as is desirable for individual fiber accessibility, hence such accessibility is substantially unimpaired.

In the fabrication of the divisible ribbon having differentially enhanced matrix-to-colorant adhesion, the individual fibers are coated with a colorant, which may be a second coating on the fiber incorporating a coloring material, or which may simply be a layer of colored ink. After the colorant is applied, it is cured, the fibers are then arranged in an array in their relative positions in the ribbon, and then are encased in a matrix material. Prior to the fibers being arranged in the array, it is determined into how many sub-units the ribbon is to be divisible and the number of fibers in each sub-unit. Thus, the position of each line of division is easily determined. For the two fibers which will be on either side of each line of division and adjacent thereto and to each other, the matrix-to-colorant adhesion characteristic is then increased just prior to the fibers being arranged in the array. If desired, the fiber can be so treated at an earlier stage in the process. Thus, if it is known that the aqua and blue fibers, for example, will be the two fibers, their treatment may take place well before being assembled in the array, at some suitable step in the process sequence.

There are several ways by which differentially enhanced matrix to ink adhesion can be achieved. An expeditious way is to reduce the amount of release agent or "slickness" additive on or in the coloring ink or coating. It has been found that if the release agent is reduced to where it is from 15% to 40% of the amount on or in the mid-span or untreated fibers, excellent results, translating into robust sub-units, are obtainable. An optimum amount appears to be approximately 25% of the amount of release agent on the remaining fibers. In some cases, the matrix-to-colorant adhesion characteristics of the mid-span fibers may be quite low, and, in other case , fairly high. The broad range given herein is intended to take this into account, although in extreme cases the upper and lower limits of the range may be exceeded slightly. Variations in the adhesion level of the ink formulation depend upon the degree of ink cure during the coloring process. If the ink is cured in the lower range of processing, as with the somewhat weaker UV lamp or a lamp of reduced power, then there remains a higher amount of residual acrylate for bonding with the matrix material, thus leading to a stronger adhesion. Similar results can also be achieved by increasing the speed of the inked fiber passing the UV lamp. Another alternative is the introduction of an oxygen atmosphere during the UV curing of the coloring agent. The presence of oxygen inhibits the cure in the top few nanometers of the fiber surface leaving it exposed to greater re action with the matrix material during ribboning. As pointed out hereinbefore, the residual acrylate unsaturation (RAU) is a measure of surface cure. Care must be exercised to avoid increasing the matrix-to-colorant adhesion too much, to the point where the matrix, when peeled, pulls the colorant layer with it.

Matrix-to-ink adhesion can also be increased by surface modification of the inked fiber after UV coloring, such as by optically or mechanically roughing or chemically treating the fiber surface. Such roughing promotes a greater mechanical adhesion between the matrix and the selected fibers.

In testing the fiber ribbon for matrix-to-colorant adhesion, a six inch ribbon sample is used. The matrix is completely removed from half of the sample using any end fiber access method e.g., glue/tape or individual fiber access. The part of the sample still covered by the matrix is placed in a vise so that the five (for example) bottom fibers of the ribbon sample are gripped throughout the length of the ribbon. The vise is then secured to the bottom of an Intron tensile tester equipped with a 90° peel test stage and forms the stationary grip of the test. The top fiber is attached to the movable grip and the force, in grams, required to peel the fiber from the ribbon matrix socket is recorded. The process is repeated for successive fibers until all fibers have been tested. Alternatively, a ribbon is separated into two sub-units and each sub-unit is secured in the vise with the exposed edge on top. The force required to peel the edge fiber out of the ribbon is measured using the same procedure. The results of such a test are shown in FIG. 4, wherein the left-hand bar A represents the mid-span fibers and the right-hand bar B represents the adhesion enhanced edge fibers In any of the foregoing modes of differentially enhancing matrix-to-ink adhesion, the net result is robust sub-units upon division of the ribbon with ease of midspan fiber access due to lower matrix-to ink adhesion being substantially unaltered.

The various modes of differential enhancement of matrix-to-ink adhesion as given herein are intended to represent the many ways that such enhancement may be achieved, and are by no means limiting. It should be noted that it will be obvious to those skilled in the art that many variations and modifications may be made to the preferred embodiment without substantial departure from the principles of the present invention. Further, in the claims hereafter, the corresponding structures, materials, acts, and equivalents of all means or step plus function elements are intended to include any structure, materials, or acts for performing the functions with other elements as specifically claimed.

What is claimed is:

1. A divisible optical fiber ribbon having an array of optical fibers enclosed in a matrix, said ribbon being divisible into sub-units along predetermined division lines;

said fibers in said array having a color coating of coloring material thereon for color coding said fibers;

a plurality of said fibers having a first, low matrix-to-color coating adhesion characteristic; and first and second adjacent fibers on either side of a division line and adjacent thereto having a second, high, matrix-to-color coating adhesion characteristic greater than the said first adhesion characteristic of said plurality of fibers.

2. A divisible optical fiber ribbon as claimed in claim 1 wherein there are a plurality of spaced division lines, and the fibers on either side of a division line and adjacent thereto each has said second, high, matrix-to-color coating adhesion characteristic.

3. A divisible optical fiber ribbon as claimed in claim 2 wherein each pair of successive dividing lines defines a potential sub-unit.

4. A divisible optical fiber ribbon as claimed in claim 3 wherein each of said potential sub-units is further defined by having at least one edge fiber, said edge fiber having said second, high, matrix-to-color coating adhesion characteristic.

5. A divisible optical fiber ribbon as claimed in claim 3 wherein said potential sub-units have first and second spaced edge fibers and one or more fibers in an array that extends between said edge fibers, said edge fibers having said second, high, matrix-to-color coating adhesion characteristic and said one or more fibers having said first, low, matrix-to-color coating adhesion characteristic.

6. A divisible optical fiber ribbon as claimed in claim 1 wherein said color coating on said fibers has a release agent, said first and second fibers having from 15% to 40% of the amount of release agent in the color coating of said plurality of fibers.

7. A divisible optical fiber ribbon as claimed in claim 6 wherein the amount of release agent in the color coating of said first and second fibers is approximately 25% of that on said plurality of fibers.

8. In the method of fabricating an optical fiber ribbon divisible into robust sub-units, wherein the individual fibers are coated with a colorant which is then cured, arranged in an array in their relative positions in the ribbon, and then encased in a matrix material, the steps of predetermining the number of sub-units into which the ribbon is to be divisible and the number of fibers to be contained in each sub-unit;

determining the relative position in the array of the lines of division for dividing the ribbon; and increasing the matrix-to-colorant adhesion characteristic of first and second adjacent fibers which are positioned on either side of the lines of division and adjacent thereto.

9. The method of fabricating an optical fiber ribbon as claimed in claim 8 wherein the colorant coating of a fiber includes a release agent, and wherein the step of increasing the matrix-to-colorant adhesion characteristic comprises reducing the amount of release agent of each of said first and second fibers.

10. The method of fabricating an optical fiber ribbon as claimed in claim 9 wherein the release agent on said first and second fibers is from 15% to 40% of the amount of release agent on the remainder of the fibers.

11. The method of fabricating an optical fiber ribbon as claimed in claim 10 wherein the amount of release agent on said first and second fibers is approximately 25% of the amount of release agent on the remainder of the fibers.

12. The method of fabricating an optical fiber ribbon as claimed in claim 8 wherein the step of increasing the matrix-to-colorant adhesion characteristic of said first and second fibers comprises decreasing the degree of curing of the colorant material to increase the residual acrylate unsaturation (RAU).

13. The method of fabricating an optical fiber ribbon as claimed in claim 12 wherein the curing is done as the fiber passes under a UV lamp, and the step of decreasing the curing of the colorant material comprises increasing the speed at which the fiber passes under the UV lamp.

14. The method of fabricating an optical fiber as claimed in claim 12 wherein the step of decreasing the curing of the colorant material comprises introducing an oxygen atmosphere into the UV curing step.

* * * * *